United States Patent
Gennetten et al.

(10) Patent No.: US 7,474,848 B2
(45) Date of Patent: Jan. 6, 2009

(54) METHOD FOR ACHIEVING CORRECT EXPOSURE OF A PANORAMIC PHOTOGRAPH

(75) Inventors: K. Douglas Gennetten, Fort Collins, CO (US); David W. Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 578 days.

(21) Appl. No.: 11/123,558

(22) Filed: May 5, 2005

(65) Prior Publication Data

US 2006/0250505 A1 Nov. 9, 2006

(51) Int. Cl.
*G03B 7/00* (2006.01)
(52) U.S. Cl. ........................................ 396/234; 348/362
(58) Field of Classification Search ............... 348/218.1, 348/373, 362; 382/294, 279, 278; 396/234
See application file for complete search history.

(56) References Cited

U.S. PATENT DOCUMENTS

| | | | |
|---|---|---|---|
| 5,578,813 A | | 11/1996 | Allen et al. |
| 5,610,654 A | * | 3/1997 | Parulski et al. ........... 348/229.1 |
| 5,644,139 A | | 7/1997 | Allen et al. |
| 5,729,008 A | | 3/1998 | Blalock et al. |
| 6,002,124 A | | 12/1999 | Bohn et al. |
| 6,005,681 A | | 12/1999 | Pollard |
| 6,195,475 B1 | | 2/2001 | Beausoleil, Jr. et al. |
| 6,229,297 B1 | | 5/2001 | Bohn |
| 6,249,360 B1 | | 6/2001 | Pollard et al. |
| 6,597,818 B2 | * | 7/2003 | Kumar et al. ............... 382/294 |
| 6,714,249 B2 | * | 3/2004 | May et al. .................... 348/373 |
| 2001/0028796 A1 | * | 10/2001 | Yamanaka et al. .......... 396/281 |
| 2002/0036693 A1 | * | 3/2002 | Kinjo ........................ 348/218 |
| 2003/0128290 A1 | * | 7/2003 | Toyofuku et al. ........... 348/364 |
| 2004/0201699 A1 | * | 10/2004 | Parulski et al. ......... 348/207.99 |

OTHER PUBLICATIONS

Live Picture Announces New PhotoVista Image Stitching Software for Creating Panoramas Optimized for the Web (Business Wire, New York, Apr. 23, 1997).*
Round Shot, Super 220 VR- Super 35, Instruction Book, Version 3, www.roundshot.ch, pp. 65, date unkown.
Donald J. Stavely,et.al., "Adaptive Response Image Stabilization", HP pending application, U.S. Appl. No. 11/046,374, filed Jun. 16, 2004, pp. 33.

* cited by examiner

*Primary Examiner*—W. B. Perkey
*Assistant Examiner*—Fang-Chi Chang

(57) ABSTRACT

A method is disclosed for achieving correct exposure, focus, or both in a panoramic photograph that is stitched together from component photographs. In one example embodiment, a camera user sweeps the camera across the scene to be photographed, at least two measurements of scene portion brightness are made during the sweep, the brightness measurements are combined, and camera exposure settings are chosen based on the combination.

48 Claims, 8 Drawing Sheets

METHOD FOR ACHIEVING CORRECT EXPOSURE OF A PANORAMIC PHOTOGRAPH

FIELD OF THE INVENTION

The present invention relates to panoramic photography, and more specifically to determining exposure settings for a panoramic photograph.

BACKGROUND OF THE INVENTION

A panoramic photograph is a photograph with an unusually large field of view, an exaggerated aspect ratio, or both. For example, a horizontal panoramic photograph is much wider than its height, and has a horizontal angle of view that is large in relation to its vertical angle of view. A vertical panoramic photograph is much taller than its width, and has a vertical angle of view that is large in relation to its horizontal angle of view.

Historically, panoramic photographs have been taken using specially-made cameras. One kind of panoramic camera uses a rotating lens and body to sweep across a large field of view while moving film past a narrow exposure slit behind the lens. This kind of rotating camera, sometimes called a "Cirkut-type" camera after an early commercial model, can take a photograph with a field of view of 360 degrees or more. A swing-lens camera operates on a similar principle, but rotates its lens and the exposure slit in relation to a stationary body and film. A swing-lens camera can take a photograph with a field of view somewhat less than 180 degrees.

Another method of making a panoramic photograph is to take several overlapping conventional photographs, each typically having an aspect ratio of about 3:2, and then join them together into a single larger photograph. The joining is typically done using a computer operating on digital representations of the component photographs. The digital representations may be obtained by scanning photographic film or prints, or may be obtained directly using a digital camera to photograph the subject. This process of combining digital images into a larger photograph is often called stitching.

FIGS. 1A-1D illustrate the process of creating a panoramic photograph from component photographs. FIG. 1A shows a landscape scene 100 with a wide aspect ratio. FIG. 1B shows three overlapping component photographs 101, 102, 103 of a conventional aspect ratio, taken so that each portion of scene 100 that is to be included in the resulting panoramic photograph is represented in at least one of the component photographs 101-103. FIG. 1C shows component photographs 101-103 in isolation. Certain features such as tree 104 and fence corner 105 appear in more than one of the component photographs, and may be used by the stitching process to align component photographs 101-103 with each other. FIG. 1D shows a panoramic photograph 106 constructed by stitching component photographs 101-103 together. Methods are known in the art for accomplishing the stitching.

It is desirable that all of a set of component photographs be taken using the same exposure and focus settings. For example, if a film camera is used to take the component photographs, the camera would be set to use the same lens aperture and exposure time for all of the photographs. If the camera used to take the component photographs is a digital camera, additional settings may be held constant as well, including the system gain (or ISO setting), white balance, or other settings.

Some Cirkut-type cameras can scan the panoramic scene that is to be photographed and automatically select exposure settings appropriate for the entire scene. However, a conventional camera, which may be used to take a set of component photographs that will be later stitched into a panoramic photograph, has a limited field of view.

Some modern digital cameras provide a mode that assists a user of the camera in taking a set of component photographs for later stitching into a panoramic photograph. A panoramic mode may use a display screen on the camera to assist the user in framing each component photograph for proper overlap with previous photographs in the set, and may ensure consistent exposure settings for all of the component photographs in a set. For example, upon being put in a panoramic mode, the camera may automatically determine focus and exposure settings for the next photograph taken, and then use those same settings for each subsequent photograph taken until the panoramic mode is exited.

However, using exposure settings, focus settings, or both determined from only the first photograph in the sequence (often the leftmost component photograph of a horizontal panorama) can result in improper exposure or focus for the panorama if the portion of the scene metered for the first photograph is not representative of the entire scene. FIG. 1A provides an example of a scene likely to be improperly exposed. Setting sun 107 creates a bright portion of the scene, and is the main subject of interest. Exposure settings determined from the darker scene portion covered by component photograph 101 will likely result in an overexposed component photograph 102, ruining the resulting panorama 106. Similarly, a focus setting selected for component photograph 101 may not be appropriate for the entire scene. For example, the camera may choose tree 108, near the camera, in photograph 101 as a focus subject, with the result that distant objects, including sun 107 and most other objects in component photographs 102 and 103, are out of focus.

DETAILED DESCRIPTION

Figure 1A:
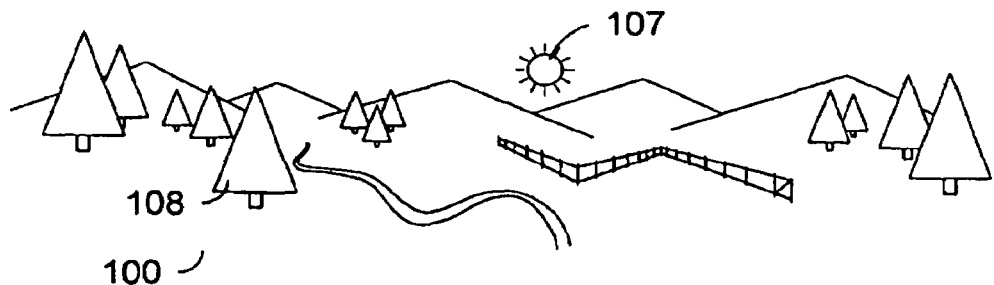
FIG. 1A shows a landscape scene with a wide aspect ratio.
Figure 1B:
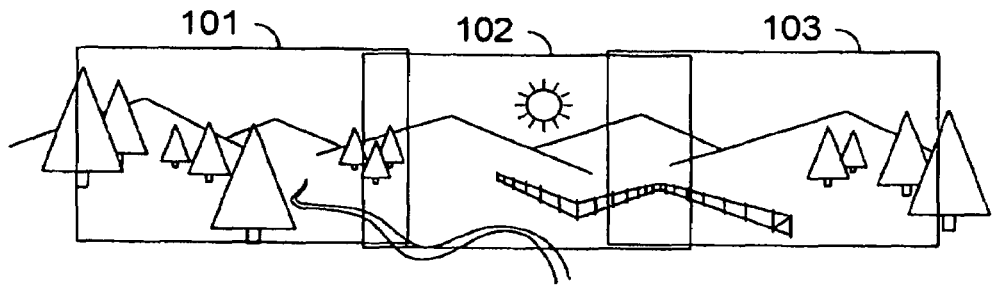
FIG. 1B shows three overlapping component photographs of a conventional aspect ratio, taken of the scene of FIG. 1A.
Figure 1C:
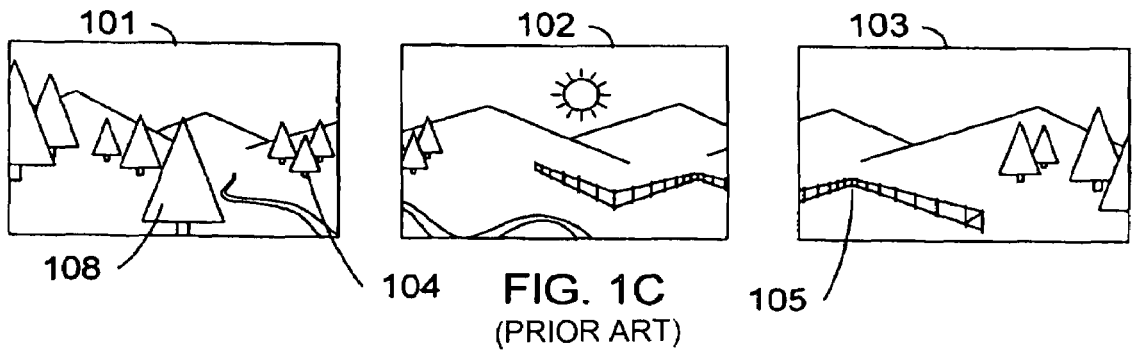
FIG. 1C shows the component photographs of FIG. 1B in isolation.
Figure 1D:
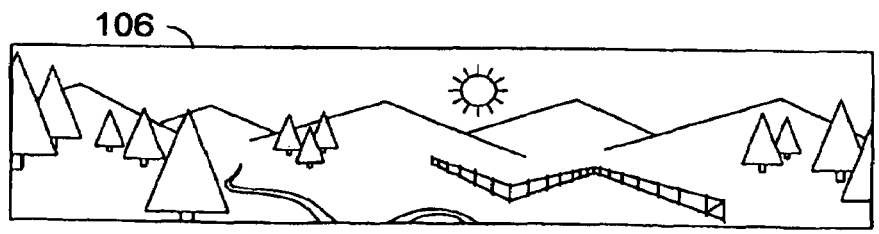
FIG. 1D shows a panoramic photograph constructed by stitching together the component photographs of FIG. 1B.
Figure 2:
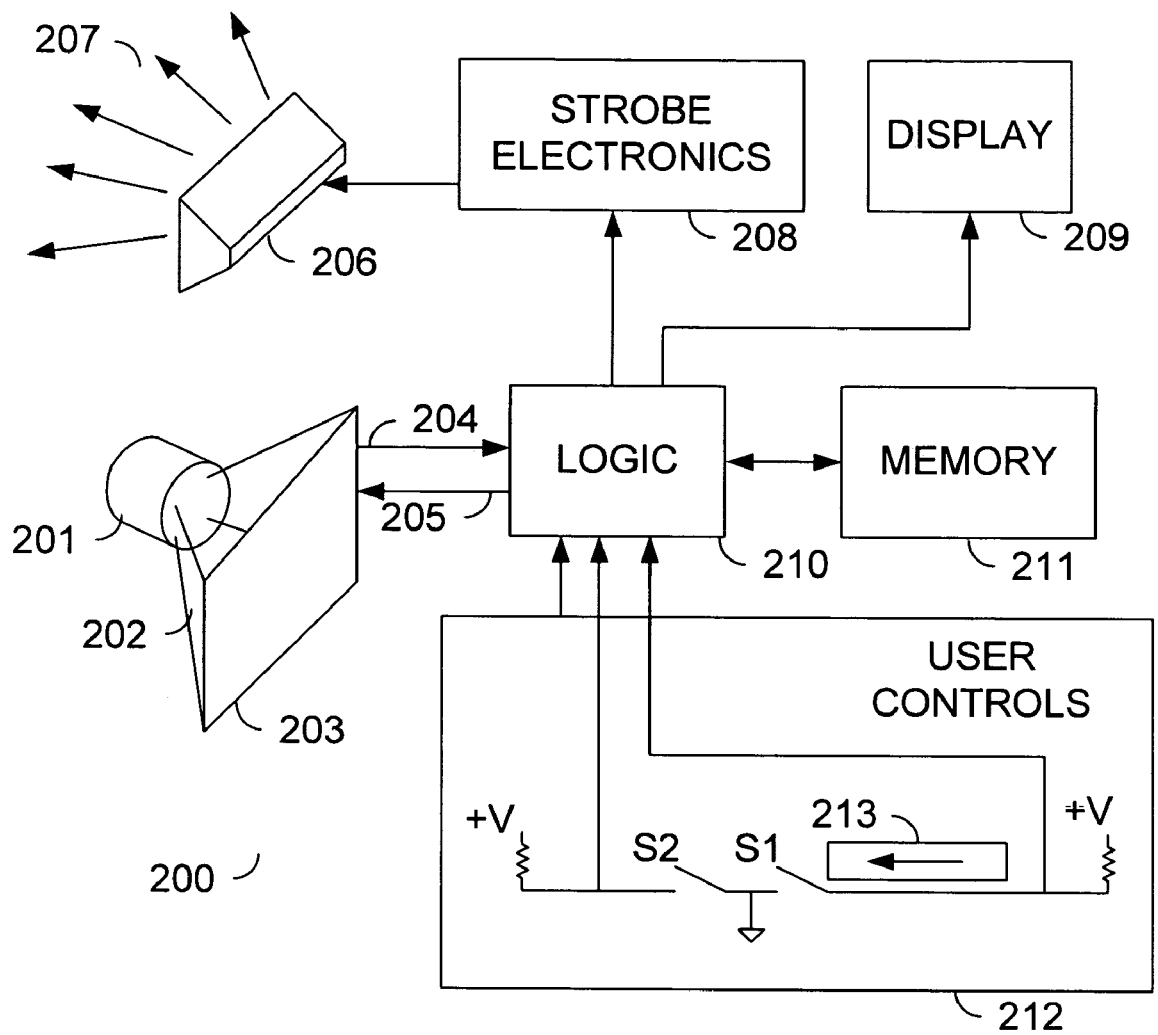
FIG. 2 shows a simplified block diagram of a digital camera.

FIG. 2 shows a simplified block diagram of a digital camera 200. Lens 201 gathers light emanating from a scene, and redirects the light 202 to an electronic array light sensor 203. Sensor 203 comprises an array of light-sensitive elements, often called pixels. Each pixel on array 203 corresponds to a particular scene location by virtue of the operation of lens 201. A common type of electronic array light sensor generates, at each pixel, electric charge at a rate proportional to the intensity of light falling on the pixel, and stores these charges in charge coupled devices. Such a sensor is often called a "CCD sensor", or simply a "CCD". Other kinds of sensors may be used as well. In many cameras, each sensor pixel also comprises a color filter so that color information about the scene is obtained. One of skill in the art will recognize that the invention may be embodied in a camera with color capability or one without. Sensor 203 communicates image data signals 204 to logic 210. Logic 210 may comprise an analog to digital converter, a microprocessor or digital signal processor, or other kinds of circuitry.

Logic 210 converts image data signals 204 to digital values representing the light intensities measured at the sensor pixel sites. An ordered array of these digital values, each representing the brightness, color, or both of a particular scene location, may be called a digital image or a digital photograph. The digital values corresponding to pixel locations on sensor 203 may be called "pixel values", or "pixels. When a digital image is properly interpreted and displayed, a representation of the original scene can be reproduced from the digital image. For the purposes of this disclosure, the term "photograph" means any recorded representation of a scene, and encompasses images recorded on photographic film, images printed on paper or other stock, and digital scene representations.

Logic 210 may also perform other functions, such as generally controlling the operation of camera 200, controlling sensor 203 through control signals 205, interacting with a user of the camera through display 209 and user controls 212, processing digital images, and transmitting digital images to other equipment for processing, display, or printing.

A flash or strobe unit 206 may provide supplemental light 207 to the scene under the control of strobe electronics 208, which are in turn controlled by logic 210. Memory 211 provides storage for digital images captured by the camera, as well as for camera configuration information, for program instructions for logic 210, and for other items.

User controls 212 comprise a shutter release button 213, which is the control that a user presses in order to initiate the taking of a photograph by camera 200. This control is commonly called a "shutter release" for historical reasons, even when it is part of modern digital camera that may not comprise a mechanical shutter. In example camera 200, shutter release 213 sequentially actuates two switches, S1 and S2, in the course of its travel. Logic 210 responds by changing the operating state of camera 200 upon each switch actuation. When switch S1 is actuated, camera 200 enters an "S1 state". In the S1 state, camera 200 may automatically focus lens 201 on a subject, and may measure the scene in order to determine proper exposure settings. In a digital camera, these operations typically involve taking a series of preliminary digital images of the scene. These preliminary digital images are typically taken in relatively rapid succession. At least some of the digital images may be examined for spatial contrast in order to determine what focus adjustments should be made, and at least some may be examined for brightness in order to determine what exposure settings camera 200 should use in taking a final photograph.

When the user further depresses shutter release 213 such that switch S2 is actuated, camera 200 enters an "S2 state". Upon entering the S2 state, a "final" photograph is taken using the settings determined during the S1 state. A final photograph is one taken using the exposure and focus settings determined during the S1 state and then stored for later retrieval. The preliminary digital images need not be kept in storage after they have been used to determine camera settings. Optionally, at least some of the preliminary digital images may be displayed on display 209 to assist the camera user in framing a final photograph.

If the user actuates shutter release 213 quickly so that camera 200 enters the S2 state directly, camera 200 performs its scene evaluation and focusing rapidly and takes the final photograph without delay. Once shutter release 213 is allowed to return to its unactuated state, the camera returns to its idle state.

Figure 3A:
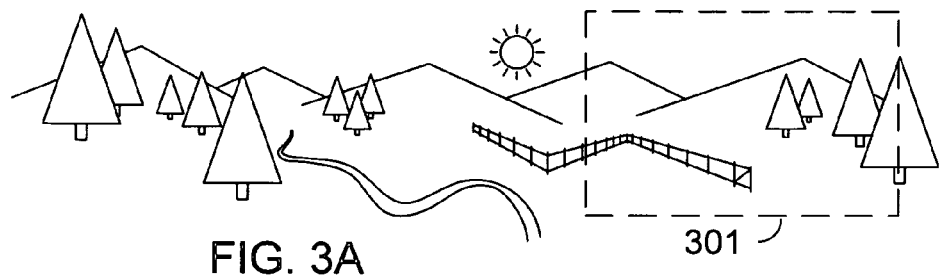
FIGS. 3A-3E depict the steps for taking a panoramic photograph in accordance with a first example embodiment of the invention.
Figure 3B:
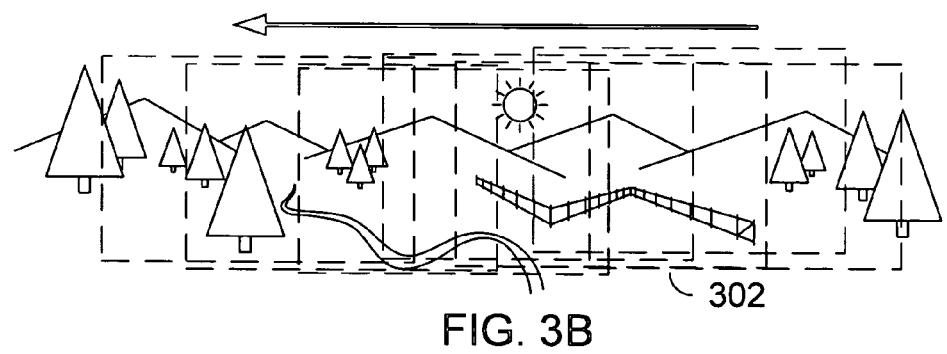
Figure 3C:
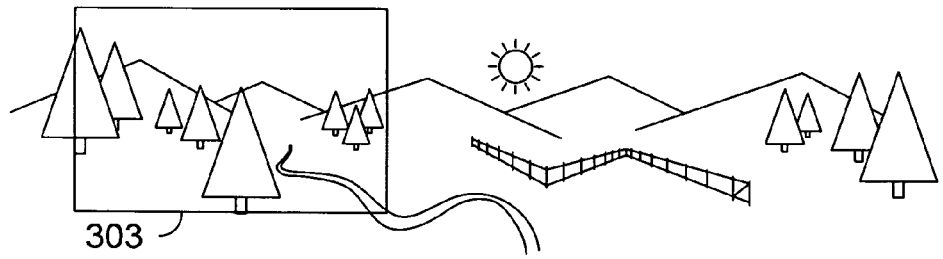
Figure 3D:
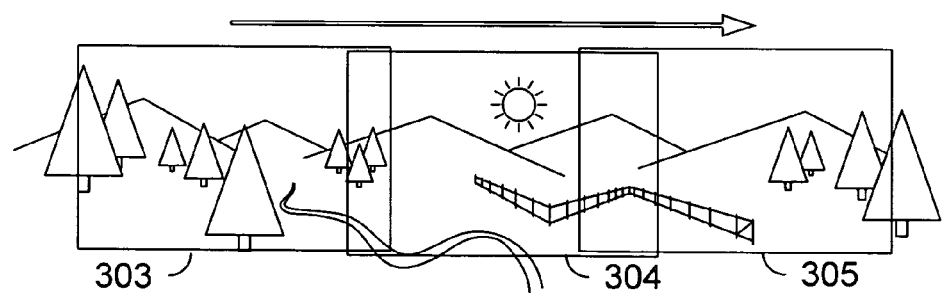
Figure 3E:
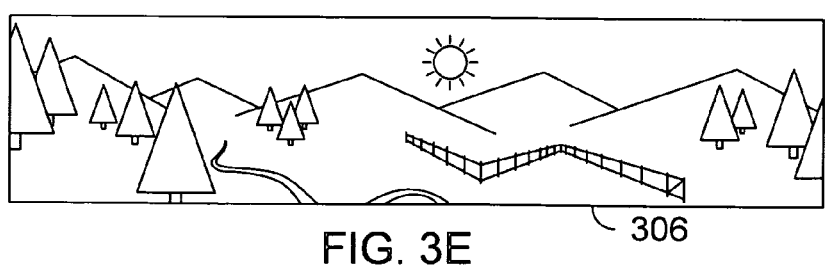

A camera in accordance with an example embodiment of the invention uses preliminary digital images of substantially all of a panoramic scene to determine settings for exposure, focus, or both. In a first example embodiment, a user takes a panoramic photograph according to the following steps, illustrated in FIGS. 3A-3E. (It is assumed that camera 200 has previously been placed in a panoramic mode.) First, the user aims the camera generally at the rightmost portion of the scene, as indicated by dashed rectangle 301 in FIG. 3A. The user may be assisted in aiming by successive preliminary digital images displayed on display 209. Once the camera is aimed at the rightmost portion of the scene, the user presses shutter release 213 to the S1 state and proceeds to sweep the camera from right to left to the leftmost portion of the scene to be photographed, holding shutter release 213 in the S1 position during the motion. This sweep is illustrated in FIG. 3B. Each dashed rectangle in the set of dashed rectangles 302 represents a preliminary digital image taken during the sweeping motion. Some or all of the preliminary images may be displayed on display 209 to assist the user in the sweeping motion. At least some of the preliminary digital images are analyzed by logic 210 and contribute to an estimate of the overall scene brightness. For example, camera 200 may record the average pixel value for each of the preliminary images, and then estimate the average brightness of the entire scene as the overall average of these averages. Alternatively, a histogram of pixel values may be constructed for each preliminary image, and those histogram frequencies accumulated to construct an approximate histogram of the entire field of view covered by the preliminary images. Techniques are known in the art for determining proper camera exposure settings from an overall average scene brightness or from a scene histogram.

If camera 200 has an enabled automatic focus capability, at least some of the preliminary digital images may also be analyzed by logic 210 to contribute to a determination of a proper focus setting for photographing the panoramic scene. For example, camera 200 may continually perform an automatic focus algorithm during the sweep, recording the settings corresponding to the nearest and most distant objects focused on during the sweep. Automatic focus algorithms are known in the art. Camera 200 may compute a proper focus setting as one that nominally focuses on objects midway between the nearest and most distant objects found in the scene.

The computed focus and exposure settings may interact. For example, if camera 200 detects that the panoramic scene includes objects very near and very far from the camera, such that a large depth of field is needed to produce a photograph with all of the objects sharply focused, the determination of exposure settings may give priority to a small lens aperture, so that the depth of field of the resulting photograph is appropriate for the scene.

Once the sweeping motion has reached the leftmost portion of the scene to be photographed, the user further depresses shutter release 213 to the S2 position, signaling to camera 200 that the scene evaluation should end. Upon entering the S2 state, camera 200, utilizing logic 210, computes proper settings for exposure, focus, or both, may complete automatic focusing if necessary, and takes the first component photograph, indicated by solid-line rectangle 303, using the computed settings. Component photograph 303 is stored for later stitching with subsequent component photographs in the intended panorama. The user then proceeds to take subsequent overlapping component photographs, such as component photographs 304 and 305, the camera using the settings computed from the set of preliminary images 302. The camera setting are said to be "locked" during the taking of the set of component photographs. Each component photograph may be stored for later stitching. The panoramic mode may be exited when the user indicates that no more component photographs are to be taken, or when a preset maximum number of component photographs is reached. The component photographs are stitched together to make panoramic photograph 306.

The sweep directions in this description are exemplary only, and other motion patterns are possible. For example, the user could begin by aiming the camera at the leftmost portion of the scene, sweeping from left to right for the evaluation sweep, and then taking component photographs in right-to-left order. Or both the sweep and the order of the component photographs could be in the same direction. For a vertical panorama any combination of up and down motions is possible. A panoramic photograph may comprise component photographs assembled in two dimensions. Such a combination is often called a "mosaic", and may comprise, for example, two or more overlapping component photographs in an upper row and two or more overlapping component photographs in one or more lower rows, the rows also overlapping. In that case, many different motion patterns are possible.

The scene metering accomplished by this first example embodiment may be described as "time weighted". That is, the contribution of each part of the scene to the overall brightness evaluation is directly related to the amount of time for which that scene location is within one of the preliminary images. Those scene portions near the center of the panorama are covered by several preliminary images, and will contribute substantially. Scene portions at the edges of the panorama appear in few or even only one preliminary image and will contribute less to the overall brightness evaluation. The camera user may wish to make the evaluation sweep cover more than the field of view that will appear in the eventual panorama so that edge scene portions are weighted more nearly equally with center scene portions. Any variations in the speed with which the evaluation sweep is made will affect the scene evaluation as well. If the user sweeps more slowly over one part of the scene, that part will contribute disproportionately to the overall brightness evaluation in comparison to a part of the scene that is swept over more quickly. For example, if an especially bright portion of the scene is swept over more slowly than the rest of the scene, the overall brightness estimate for the entire scene will be higher (brighter) than if the scene had been swept at a uniform rate. Even if some variation is present, the consideration of substantially the entire scene in the determination of camera exposure settings provides a significant improvement in exposure accuracy as compared with choosing exposure settings based on only one component photograph.

Figure 4A:
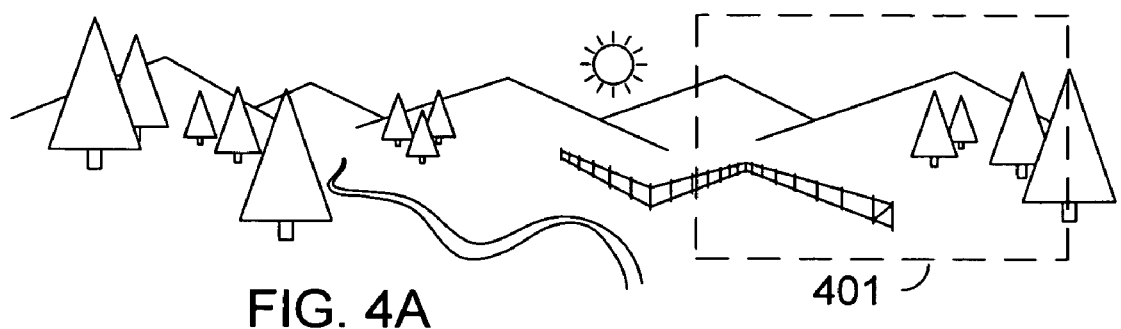
FIGS. 4A-4C depict the steps for taking a panoramic photograph in accordance with a second example embodiment of the invention.
Figure 4B:
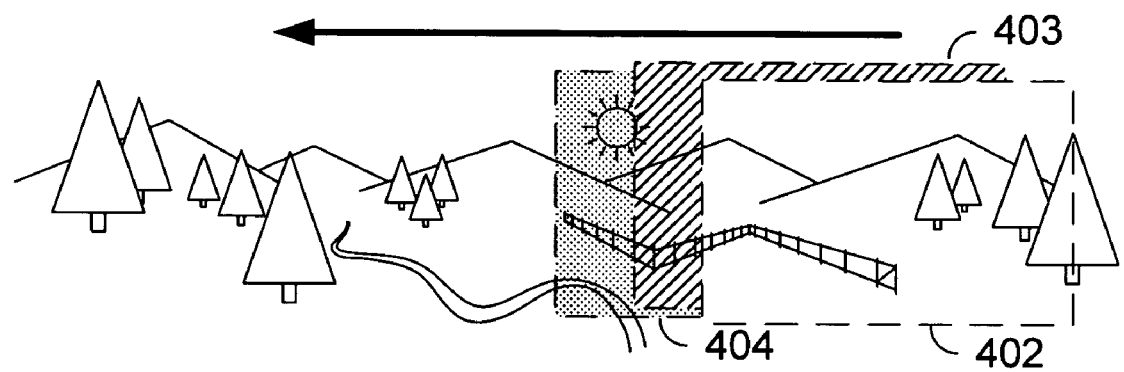
Figure 4C:
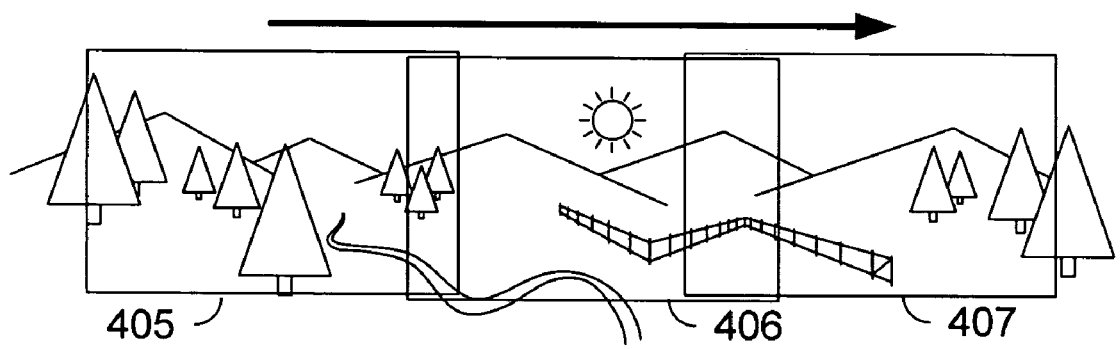

In a method in accordance with a second example embodiment of the invention, "position weighted" metering is used rather than the time weighted metering used in the first example embodiment described above. In this second example embodiment, preliminary images covering substantially all of a panoramic scene are gathered and evaluated to determine proper exposure settings for the entire scene, but each scene location contributes substantially equally to the overall brightness evaluation of the scene. Using this second example embodiment, the camera user takes a panoramic photograph according to the following steps, illustrated in FIGS. 4A-4C. First, the user aims the camera generally at the rightmost portion of the scene to be photographed, as indicate by dashed rectangle 401 in FIG. 4A. The user then presses shutter release 213 to the S1 position and sweeps the camera from right to left across the scene. During the sweep, the camera takes a series of preliminary images, similar to set 302. Three of the preliminary images 402, 403, 404 are illustrated in FIG. 4B. In this second example embodiment, in evaluating the overall scene brightness, the camera nominally considers only that portion of each preliminary image that has not been previously considered in another preliminary image. For example, all of preliminary image 402 is considered. The average pixel brightness may be added to a weighted sum of brightnesses from which an overall average scene brightness will be computed, or the brightness value of each pixel value may be accumulated in an exposure histogram that will eventually include pixel values gathered from the entire scene. Only the crosshatched portion of preliminary image 403, visible in FIG. 4B, is considered in the scene brightness evaluation. For example, brightness values from only those pixels in image 403 that have not been previously considered could be added to an accumulator from which an overall average scene brightness is to be later computed. Or preferably the brightness value of each pixel in the visible crosshatched area may be accumulated in the exposure histogram previously described. Similarly, only the shaded portion of image 404 visible in FIG. 4B is considered in the overall scene brightness evaluation. This process continues while the user sweeps the camera over the scene. Because pixels from a preliminary image contribute to the overall brightness evaluation only if they represent a scene portion not previously considered, each scene portion contributes nominally only once to the scene evaluation. Scene locations near the edges of the scene contribute substantially equally with scene locations near the center of the scene, and the scene evaluation is substantially unaffected by variations in the speed of the sweeping motion. If a particular portion of the scene is swept more slowly than another portion, fewer pixels from each preliminary image in that portion are considered.

When the sweep reaches the leftmost portion of the scene to be photographed, the user further depresses shutter release 213 to the S2 position, signaling that the scene evaluation is to end. The camera, utilizing logic 210, then finishes the scene evaluation computations, determines the proper settings for exposure, focus, or both, and takes component photograph 405, illustrated in FIG. 4C. The user can then take other component photographs such as photographs 406 and 407, the camera using the same settings as it used in taking component photograph 405. The panoramic photograph is stitched as has been previously described. As in the first example embodiment, the directions of camera movement during the evaluation sweep and the taking of component photographs 405, 406 and 407 may be reversed, made the same, made vertical, follow a 2-dimensional pattern, or be performed in some other manner.

Within this second example embodiment, the determination of which pixels in a particular preliminary image have not been previously considered may be accomplished in one of at least two ways. In a first method of determining which pixels have not been previously considered, pairs of images are examined based on their content to determine which areas of the images overlap. Preferably, this is accomplished by finding the alignment of best correlation between the two images.

Figure 5:
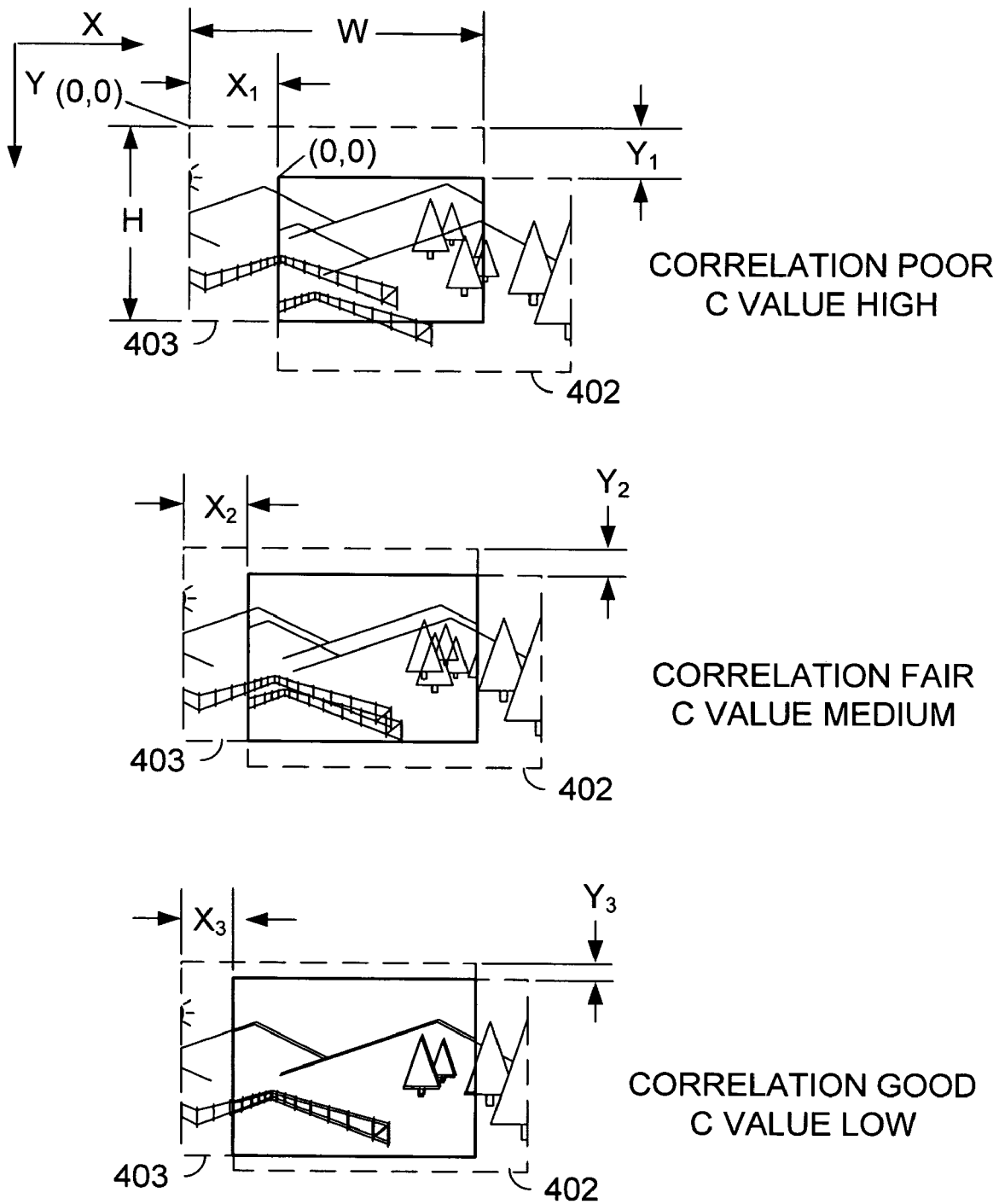
FIG. 5 illustrates the process of correlation.

FIG. 5 illustrates the process of correlation, using preliminary images 402 and 403 as examples. In FIG. 5, each preliminary image has a width of W pixels and a height of H pixels, and the displacement of preliminary image 403 from image 402 is X pixels in the X direction and Y pixels in the Y direction. Each image has its origin in its upper left corner. A particular pixel brightness value for a pixel at location (x, y) in image 402 is given by $P_{402}(x, y)$. A correlation value for the overlapping region of the two images may be computed, for example, as $$C = \frac{1}{(W-X)(H-Y)} \sum_{x=0}^{W-X-1} \sum_{y=0}^{H-Y-1} [P_{402}(x, y) - P_{403}(x+X, y+Y)]^2$$

for the case where X and Y are both positive. The value of C will be higher when the images are poorly aligned, as is shown in FIG. 5A. FIG. 5B shows the image in somewhat better alignment, so that the value of C is somewhat smaller. The alignment of best correlation occurs when values for X and Y are found that minimize the value of C. In the example of FIG. 5, best alignment is found when X=X3 and Y=Y3, illustrated in FIG. 5C. Once the alignment of best correlation is located, locating the pixels in image 403 that have not been considered in image 402 is straightforward. In the example of FIG. 5, the pixels of interest (corresponding to the cross-hatched area of image 403 in FIG. 4B) are those pixels of image 403 with x<X3 or y<Y3 or both.

In practice, it may be desirable to compensate for such effects as lens barrel distortion and perspective distortion in the component images before performing the search for the alignment of best correlation. It may also be desirable to provide dedicated hardware in logic 210 for performing the search quickly. Image alignment using correlation is known in the art. See for example U.S. Pat. No. 6,195,475 to Beausoleil, Jr. et al., entitled "Navigation system for handheld scanner."

In a second method of determining which pixels have not been previously considered, camera angular position is sensed using one or more accelerometers, rate gyroscopes, or other sensors. The angular position information, recorded for each component photograph and coupled with information about the lens field of view, enables determination of the portion of the scene encompassed by each preliminary photograph, and therefore which portion of each preliminary photograph has not been previously considered. This method is particularly suited to a camera having an image stabilization capability, as implementation of the method may utilize image stabilization hardware already comprised in the camera.

Figure 6:
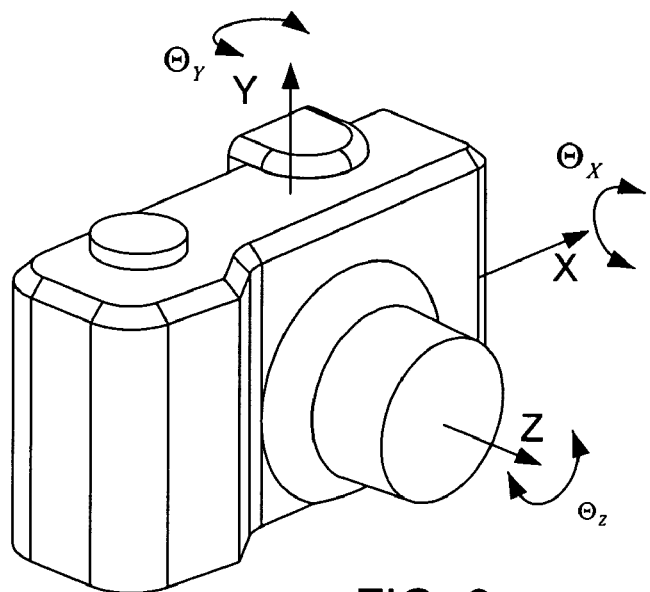
FIG. 6 depicts a coordinate system convenient for describing camera rotations.

An image stabilization system compensates for camera motions that can cause image blur. FIG. 6 depicts a coordinate system convenient for describing camera rotations. In general, camera rotation about the X and Y axes, called pitch and yaw respectively, can cause significant image blur if the rotation occurs during the exposure of a photograph. An image stabilization system compensates for blur-causing camera motion by sensing the motion and moving an optical element within the camera in such a way that the effect of the motion is countered. The moving optical element may be, for example, a lens element, a prism, or, in a digital camera, the image sensor. Image stabilization is known in the art. See, for example, pending U.S. patent application Ser. No. 11/046,374 of Stavely, et al., entitled "Adaptive response image stabilization."

Figure 7:
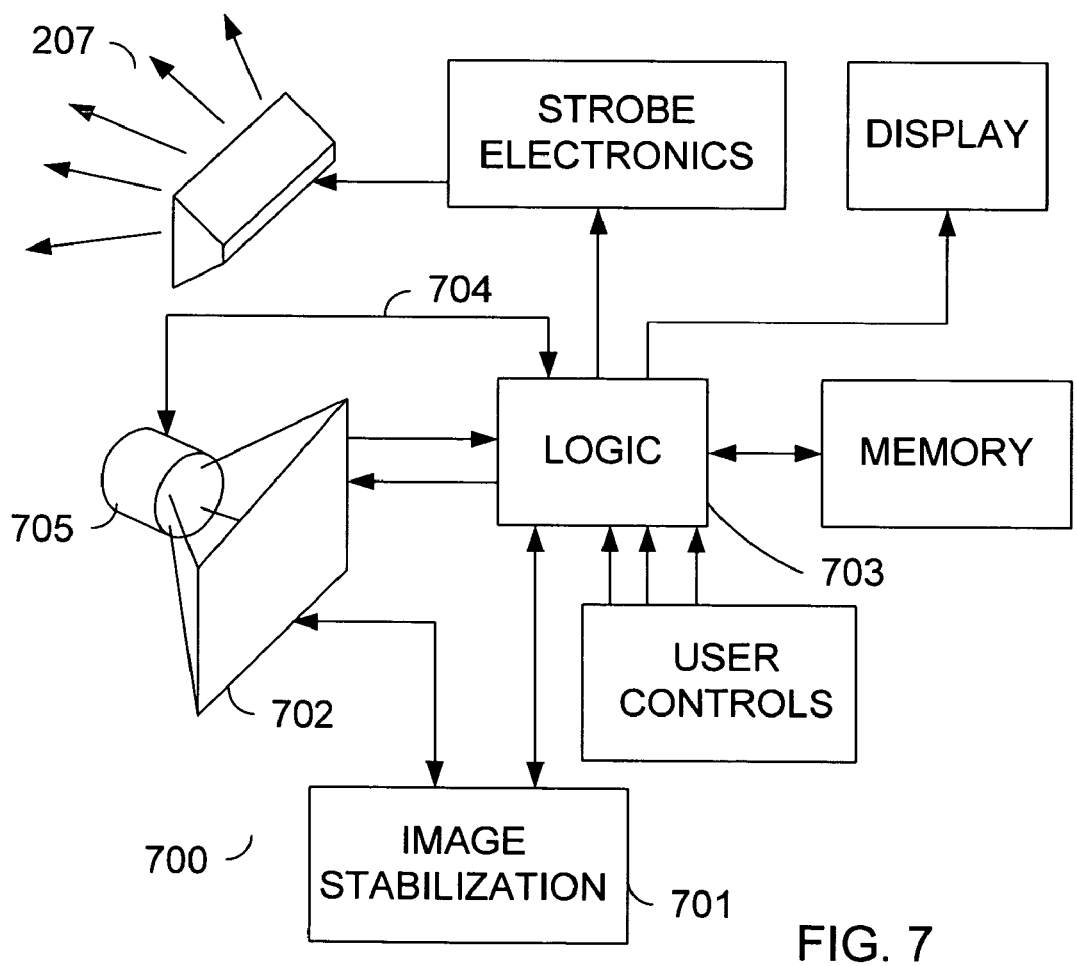
FIG. 7 depicts a simplified block diagram of a digital camera in accordance with an example embodiment of the invention and comprising an image stabilization system.

FIG. 7 depicts a simplified block diagram of a digital camera 700 in accordance with an example embodiment of the invention and comprising an image stabilization system. Image stabilization block 701 senses camera rotation and, acting in concert with logic 703, moves sensor 702 in such a way as to optically counter the motion. Logic 703 may also exchange signals 704 with lens 705 in order to control the focus and focal length of lens 705.

Figures 8, 9:
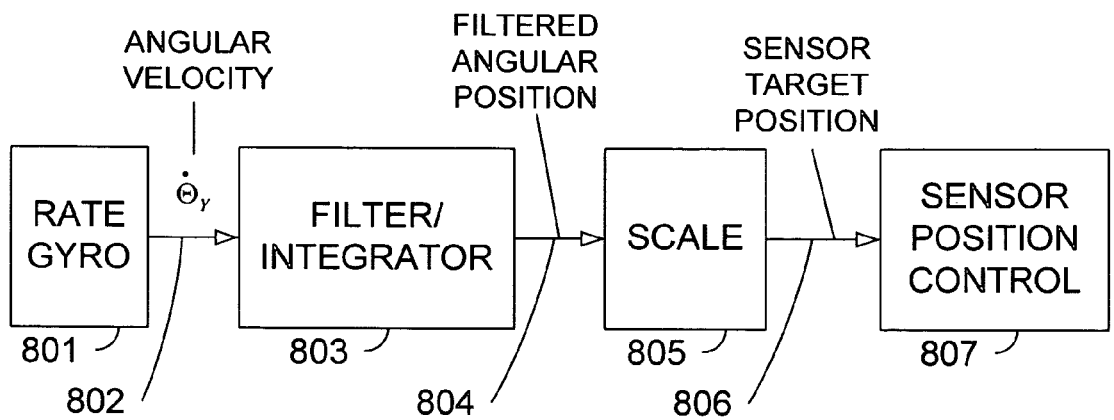
FIG. 8 shows a portion of image stabilization system of the camera of FIG. 7 in more detail.
FIG. 9 shows a portion of an image stabilization system, modified in accordance with an example embodiment of the invention.

FIG. 8 shows a portion of image stabilization block 701 in more detail. The block diagram of FIG. 8 shows a control system for compensating camera rotation about the Y axis. The components of FIG. 8 are replicated for compensating camera rotation about the X axis. Rate gyroscope 801 senses the angular velocity of the camera about the Y axis and produces a signal 802 indicating the angular velocity. Rate gyroscope 801 may be, for example, a model EMC-03MA rate gyroscope available from Murata Manufacturing Co., Ltd., of Kyoto, Japan. Angular velocity signal 802 is passed to filter/integrator block 803, which produces a filtered angular position signal 804. For image stabilization purposes, filter/integrator block 803 may filter angular velocity signal 802 so that only relatively high-frequency motions are compensated, on the assumption that relatively low-frequency camera motions are intentional on the part of the photographer. Filtered angular position signal 804 is scaled at block 805 to match the current lens focal length and other factors affecting the system gain, producing a sensor target position signal 806. Sensor target position signal 806 is used by sensor position control block 807 to accomplish the sensor motion.

Filter/integrator 803 is preferably implemented digitally, using a microprocessor, digital signal processor, or other circuitry that may be part of camera logic 703. As such, it is straightforward to produce an unfiltered angular position signal 901, which is the integral of angular velocity signal 802. FIG. 9 shows a portion of an image stabilization system, modified in accordance with an example embodiment of the invention to produce unfiltered angular position signal 901. Unfiltered angular position signal 901, combined with a similar signal indicating angular position about the X axis, indicates the direction camera 700 is pointed. Example camera 700 uses these signals in conjunction with information about the angular field of view of lens 705 to compute the overlap between successive component photographs, and therefore to determine which pixels in a component photograph have not been previously considered in the estimation of the proper exposure for a panoramic photograph.

The angular field of view of lens 705 may be estimated from its focal length and the size of sensor 702. Where f is the lens focal length and w is the sensor width, both preferably measured in millimeters, the horizontal angular field of view $\beta_w$ is given approximately by $$\beta_w = 2atn\frac{w}{2f}.$$

Similarly, the vertical angular field of view $\beta_h$ is approximated by $$\beta_h = 2atn\frac{h}{2f},$$

where h is the height of sensor 702. Even if lens 705 is a zoom lens, its focal length f is generally known to logic 703 because lens 705 is under the control of logic 703, or because lens 705 communicates its focal length to logic 703.

Figure 10:
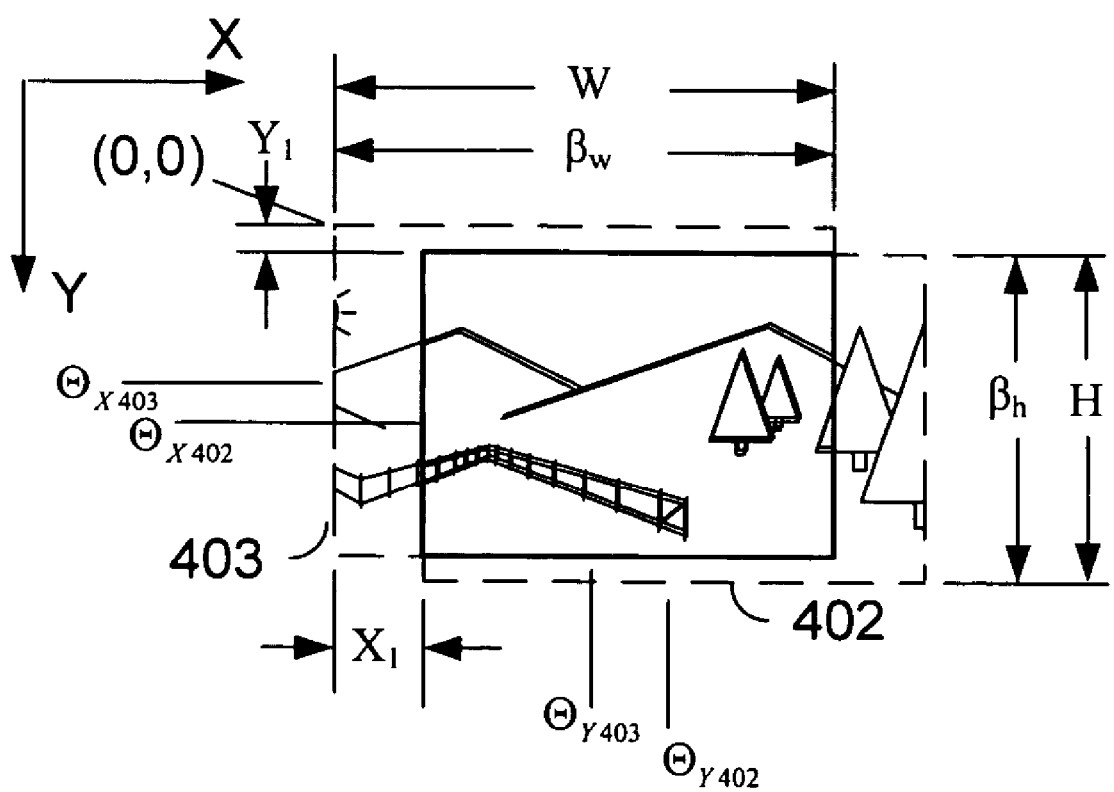
FIG. 10 illustrates computing the area of overlap of two successive preliminary photographs, using angular position information.

FIG. 10 illustrates computing the area of overlap of two successive preliminary photographs, using angular position information and using preliminary photographs 402 and 403 as examples. The quantity .THETA..sub.Y402 is the horizontal angular position of the camera, recorded at the time preliminary photograph 402 was taken. Similarly, .THETA..sub.Y403 is the horizontal angular position of the camera, recorded at the time preliminary photograph 403 was taken. The quantities .THETA..sub.X402 and .THETA..sub.X403 are analogous vertical angular positions. For this example where photograph 403 is offset to the left and above photograph 402, the number of pixels by which the two photographs are offset from each other in the horizontal and vertical directions are given respectively by X1=(.THETA. Y .times. .times. 402−.THETA. Y .times. .times. 403) .beta. w .times. W .times. .times. and .times. .times. Y1=(.THETA. X .times. .times. 403−.THETA. X .times. .times. 402) .beta. h .times. H Recall that W and H are the width and height respectively, measured in pixels, of a component photograph. One skilled in the art will readily recognize similar relations for cases where photograph 403 is offset below photograph 402, offset to the right of photograph 402, or both.

Once the quantities $X_1$ and $Y_1$ are determined for example photographs 402 and 403, it is straightforward to determine which pixels of photograph 403 correspond to scene locations outside the view of photograph 402, and which therefore have not been previously considered in the estimation of the proper exposure of the ultimate panoramic photograph. In this example, the pixels of interest are those in photograph 403 having x<$X_1$ or y<$Y_1$, or both.

This second method of determining which pixels of a preliminary photograph have not been previously considered, so that position-weighted exposure determination is enabled, has the advantage that very little computation is involved when the angular position signals are readily available.

Of course, whichever method is used to determine which pixels in a preliminary photograph represent scene portions not previously considered, some imprecision is likely. Nominally, each scene location is considered once and only once. However, practical factors as rounding error, tolerances, electrical or image noise, lighting variations, and other effects may cause some small portions of a scene, generally near the edges of preliminary photographs, to be considered more than once in the determination of camera settings, and some small portions to be missed. Such minor imprecision is easily tolerable, and is intended to be within the scope of the appended claims.

While the invention has been explained thus far in the context of an example digital camera, one skilled in the art will recognize that it may be embodied in a film camera as well. Even a camera with an exposure meter that makes only a single overall scene brightness measurement at each reading can be used to implement time weighted scene metering in accordance with an example embodiment of the invention. Many modern film cameras use a multi-segment sensor similar to electronic array light sensor 203 to perform light metering, and also comprise control logic that may be programmed to perform a method in accordance with an embodiment of the invention. Such camera could perform either time weighted or position weighted metering, or both.

The invention claimed is:

1. A method, comprising:
   manually sweeping a camera across a panoramic scene;
   making more than one measurement of scene brightness during the sweep;
   automatically combining the measurements of scene brightness; and
   automatically selecting at least one exposure setting based on the combination.

2. The method of claim 1, wherein combining the measurements of scene brightness comprises averaging the measurements.

3. The method of claim 1, wherein making a measurement of scene brightness further comprises taking a preliminary digital photograph.

4. The method of claim 1 wherein combining the measurements of scene brightness comprises accumulating pixel brightness values in an exposure histogram.

5. The method of claim 1, wherein combining the measurements of scene brightness further comprises combining the measurements on a time weighted basis.

6. The method of claim 1, wherein combining the measurements of scene brightness further comprises combining the measurements on a position weighted basis.

7. The method of claim 6, further comprising detecting camera motion between measurements of scene brightness.

8. The method of claim 7, wherein detecting camera motion further comprises finding an alignment of best correlation between two digital images.

9. The method of claim 7, wherein detecting camera motion further comprises: sensing a rotational acceleration of the camera; and integrating a signal that indicates the rotational acceleration.

10. The method of claim 7, wherein detecting camera motion further comprises sensing a rotational velocity of the camera; and integrating a signal that indicates the rotational velocity.

11. The method of claim 6, wherein combining the measurements on a position weighted basis further comprises: taking first and second digital images, the first and second digital images encompassing different portions of a scene; identifying pixels in the second digital image that correspond to scene locations not appearing in the first digital image.

12. The method of claim 1 further comprising: considering in the combination of measurements of scene brightness those pixels in the second digital image that correspond to scene locations not appearing in the first digital image; and excluding from consideration any pixels in the second digital image that correspond to scene locations that do appear in the first digital image.

13. The method of claim 1, further comprising detecting that the camera has been placed in a panoramic mode.

14. The method of claim 1, wherein selecting the at least one exposure setting occurs upon the camera being placed in an S2 state where switch S2 is actuated.

15. The method of claim 1, further comprising taking two or more photographs using the at least one selected exposure setting.

16. The method of claim 15, further comprising stitching the two or more photographs to form a panoramic photograph.

17. The method of claim 1, wherein the at least one exposure setting is any setting or combination of settings taken from a set of settings consisting of an exposure time, an aperture size, a system gain, and a white balance setting.

18. The method of claim 1, further comprising: locking the exposure settings of the camera; taking a set of component photographs that are to be stitched into a panoramic photograph; and unlocking the settings when the set is complete.

19. A method, comprising:
  detecting an indication that a camera is to begin metering a panoramic scene;
  making more than one measurement of scene brightness while the camera moves to meter the panoramic scene;
  automatically combining the measurements of scene portion brightness;
  automatically determining at least one exposure setting based on the combination; and
  taking, using the determined at least one exposure setting, two or more subsequent photographs that are to be stitched into a panoramic photograph of the scene.

20. The method of claim 19, wherein the indication that the camera is to begin metering a panoramic scene is the placing of the camera in an S1 state where switch S1 is actuated, while in a panoramic mode.

21. The method of claim 19, further comprising detecting that the camera has been placed in an S2 state, and wherein determining the at least one exposure setting occurs upon the camera being placed in the S2 state where switch S2 is actuated.

22. The method of claim 19, further comprising using the at least one determined exposure setting in the taking of subsequent photographs until an indication is detected that new settings are to be used.

23. The method of claim 22, wherein the indication is the exiting of a panoramic mode.

24. The method of claim 19, further comprising using the at least one determined exposure setting for the taking of a preselected number of subsequent photographs.

25. The method of claim 19, wherein the at least one exposure setting is any setting or combination of settings taken from a set of settings consisting of an exposure time, an aperture size, a system gain, and a white balance setting.

26. A camera, comprising a logic unit, the logic unit configured to enable the camera to perform the following method:
  entering a panoramic mode;
  making at least two measurements of the brightness of portions of a panoramic scene as the camera sweeps across the panoramic scene; and
  combining the measurements to obtain a characterization of the brightness of the panoramic scene.

27. The camera of claim 26, wherein the method further comprises selecting at least one exposure setting based on the characterization of the brightness of the panoramic scene.

28. The camera of claim 27, wherein the at least one exposure setting is any setting or combination of settings taken from a set of settings consisting of an exposure time, an aperture size, a system gain, and a white balance setting.

29. The camera of claim 27, wherein the method further comprises taking at least two subsequent photographs using the at least one selected exposure setting.

30. The camera of claim 29 wherein the at least two subsequent photographs are to be stitched into a panoramic photograph of the scene.

31. The camera of claim 26, wherein combining the measurements of scene brightness further comprises averaging the measurements.

32. The camera of claim 26, wherein the measurements of scene brightness are combined in a time weighted manner.

33. The camera of claim 26, wherein making a measurement of scene brightness further comprises taking a preliminary digital photograph of a portion of the scene.

34. The camera of claim 33, wherein combining the measurements of scene brightness comprises accumulating at least some pixels from each preliminary digital photograph in an exposure histogram.

35. The camera of claim 26, wherein the measurements of scene brightness are combined in a position weighted manner.

36. The camera of claim 26, wherein: making a measurement of scene brightness further comprises taking a preliminary digital photograph of a portion of the scene; and in combining the measurements of scene brightness, pixels from a preliminary digital photograph that correspond to scene locations that also appear in a prior preliminary digital photograph are excluded from the combination.

37. The camera of claim 36, wherein: the pixels to be excluded from the combination reside in a portion of a preliminary digital photograph that overlaps with a portion of a previous preliminary digital photograph; and the degree of overlap is determined by finding an alignment of best correlation between the two digital photographs.

38. The camera of claim 36, further comprising a rotation sensor, and wherein: the pixels to be excluded from the combination reside in a portion of a preliminary digital photograph that overlaps with a portion of a previous preliminary digital photograph; and the degree of overlap is determined by comparing angular positions of the camera measured at the taking of each of the preliminary digital photographs.

39. The camera of claim 38, further comprising an image stabilization system, and wherein the rotation sensor is comprised in the image stabilization system.

40. The camera of claim 38, wherein the rotation sensor is a rate gyroscope, and camera angular position is derived by integrating a signal output from the rate gyroscope.

41. The camera of claim 38, further comprising a second rotation sensor, one rotation sensor sensing camera yaw, and the other sensor sensing camera pitch.

42. A camera, comprising: means for measuring brightness of more than one portion of a panoramic scene while the camera is manually swept across the scene by a user; means for automatically combining the brightness measurements into a characterization of the brightness of the entire panoramic scene.

43. The camera of claim 42 further comprising means for determining exposure settings to be used in taking more than one component photograph, each component photograph encompassing a portion of the panoramic scene.

44. The camera of claim 42, further comprising means for performing image correlation, and wherein combining the brightness measurements is performed on a position weighted basis by identifying, using image correlation, portions of the panoramic scene previously considered in the combination.

45. The camera of claim 42, further comprising means for measuring camera rotation, and wherein combining the brightness measurements is performed on a position weighted basis using measurements of camera rotation.

46. A method, comprising: manually sweeping a camera across a panoramic scene; making more than one focus determination and more than one scene brightness measurement during the sweep; automatically selecting a camera focus setting based on the more than one focus measurement made during the sweep; and automatically selecting at least one camera exposure setting based on the more than one scene brightness measurement made during the sweep.

47. The method of claim 46, further comprising: locking the camera focus and exposure settings; and taking, using the locked settings, a set of component photographs that are to be stitched into a panoramic photograph of the scene.

48. A camera, comprising an automatic focus capability and a logic unit, the logic unit configured to enable the camera to perform the following method: making more than one focus determination and more than one scene brightness measurement during a manual sweep across a panoramic scene; automatically selecting, based on the more than one focus determination, a focus setting; and automatically selecting, based on the more than one scene brightness measurement, at least one camera exposure setting; the selected focus setting and the selected at least one exposure setting to be used in taking component photographs, the component photographs to be stitched into a panoramic photograph of the scene.

* * * * *

UNITED STATES PATENT AND TRADEMARK OFFICE
CERTIFICATE OF CORRECTION

PATENT NO. : 7,474,848 B2  
APPLICATION NO. : 11/123558  
DATED : January 6, 2009  
INVENTOR(S) : K. Douglas Gennetten et al.

It is certified that error appears in the above-identified patent and that said Letters Patent is hereby corrected as shown below:

In column 9, lines 34-37, delete "X1=(.THETA. Y .times. .times. 402-.THETA. Y .times. .times. 403) .beta. w .times. W .times. .times. and .times. .times. Y1=(.THETA. X .times. .times. 403-.THETA. X .times. .times. 402) .beta. h .times. H" and insert -- 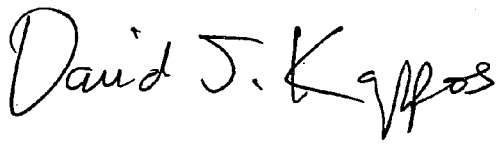 --, therefor.

In column 10, line 59, in Claim 12, delete "claim 1" and insert -- claim 11 --, therefor.

Signed and Sealed this

Third Day of November, 2009

*David J. Kappos*  
*Director of the United States Patent and Trademark Office*